United States Patent [19]

Fredholm et al.

[11] Patent Number: 6,062,047
[45] Date of Patent: *May 16, 2000

[54] DEVICE FOR MANUFACTURING A ROD OF A MATERIAL HAVING A CROSS-SECTIONAL COMPOSITION GRADIENT

[75] Inventors: Allan Mark Fredholm, Mennecy; Alain Kerdoncuff, Vincennes; Michel Prassas, Vulaines Sur Seine, all of France

[73] Assignee: Corning Incorporated, Corning, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/630,652

[22] Filed: Apr. 10, 1996

Related U.S. Application Data

[60] Provisional application No. 60/004,515, Sep. 29, 1995.

[30] Foreign Application Priority Data

Apr. 19, 1995 [FR] France .................................. 95 04646

[51] Int. Cl.$^7$ .................................................. C03B 37/022
[52] U.S. Cl. ................................ 65/488; 65/502; 65/25.1; 65/121; 65/145; 65/182.2
[58] Field of Search .................. 65/488, 502, 404, 65/405, 25.1, 145, 182.2, 121; 425/133.1, 130

[56] References Cited

U.S. PATENT DOCUMENTS

| 3,298,808 | 1/1967 | Macks . | |
|---|---|---|---|
| 3,614,197 | 10/1971 | Nishizawa et al. . | |
| 4,023,953 | 5/1977 | Megles | 65/121 |
| 4,145,200 | 3/1979 | Yamazaki | 65/405 |
| 4,248,614 | 2/1981 | Scherer . | |
| 4,351,659 | 9/1982 | Beales | 65/405 |
| 4,383,843 | 5/1983 | Iyengar | 65/435 |
| 4,620,861 | 11/1986 | Berkey . | |
| 4,624,692 | 11/1986 | Roba | 65/405 |
| 4,883,522 | 11/1989 | Hagerty et al. . | |
| 4,929,065 | 5/1990 | Hagerty et al. . | |
| 5,069,700 | 12/1991 | Yamane et al. . | |
| 5,364,432 | 11/1994 | Leber | 65/121 |

FOREIGN PATENT DOCUMENTS

| 0109131 | of 0000 | European Pat. Off. . | |
|---|---|---|---|
| 0560638 | of 0000 | European Pat. Off. . | |
| 2504515 | of 0000 | France . | |
| 60-176938 | 9/1985 | Japan | 65/502 |
| 2179342 | of 0000 | United Kingdom . | |

OTHER PUBLICATIONS

Patent Abstract of Japan, vol. 16, No. 13 (C–0901), Jan. 14, 1992 & JP–A–03 232734 (Kokusai Denshin Denwa Co Ltd) Oct. 16, 1991.

Glastechnische Berichte, vol. 67, No. 3, Mars 1994 Frankfurt, DE, pp. 61–64, XP 000433742 Rammo "Shaping of Glass Melts by Continuous Pull Extrusion".

Primary Examiner—John Hoffmann
Attorney, Agent, or Firm—Milton M. Peterson; Angela N. Nwaneri

[57] ABSTRACT

The material is in a fluid state at a predetermined temperature above the ambient temperature. According to the invention: a) at least two different compositions of this material in the fluid state are prepared; b) simultaneously and concentrically both the core of the rod with the aid of one of the compositions and a sheath enveloping this core with the aid of another composition are cast; and c) the casting is then taken to a temperature at which it solidifies to constitute the rod. Advantageously, the section of the casting is made to grow by its passing through a cylindrical mold shaped to define the final section of the rod. Application to the manufacture of a glass rod presenting a cross-sectional refractive index gradient.

3 Claims, 5 Drawing Sheets

DEVICE FOR MANUFACTURING A ROD OF A MATERIAL HAVING A CROSS-SECTIONAL COMPOSITION GRADIENT

FIELD OF THE INVENTION

This application claims the benefit of U.S. Provisional Application No. 60/004,515, filed Sep. 29, 1995, entitled "Procedure and Device for Manufacturing a Rod of a Material Presenting a Cross-Sectional Composition Gradient, Especially a Glass Rod", by Allan Fredholm, Alain Kerdoncuff and Michel Prassas.

BACKGROUND OF THE INVENTION

The present invention is related to a procedure and a device for manufacturing a rod of a material presenting a cross-sectional composition gradient and, more particularly, to such a procedure and such a device that make it possible to manufacture a glass rod of which one characteristic, such as the refractive index, the optical density, the ionic conductivity, etc., presents a cross-sectional gradient of a predetermined profile, established by a cross-sectional variation of its composition.

Commonly used today are optical components such as lenses made of a glass that presents an axially symmetric refractive index gradient transversely to the axis of the lens. Also used are optical fibers that present such an index gradient. In order to make such optical components, the composition of the glass is altered transversely to the axis of the component to be obtained by different techniques such as ion exchange (see FR-A-2,504,515), impregnation by the so-called "sol-gel" technique (see U.S. Pat. No. 5,069,700), the use of glass compositions starting with powder (U.S. Pat. No. 4,883,522), the use of a selectively doped porous glass (U.S. Pat. No. 4,620,861), the joining by fusion of glass chips of varied compositions (U.S. Pat. No. 4,929,065), if not by other techniques such as the exposure to neutron radiation, the deposition of glass in a vapor phase (in particular, for optical fibers), etc.

The techniques used heretofore share the application of discontinuous, i.e., batch manufacturing processes, with the discontinuity involving down time which is detrimental from the point of view of productivity of the process and therefore also from the point of view of reducing production costs. Moreover, the known procedures do not allow making, at least economically, components with diameters greater than 1 or 2 cm. The index gradients obtained furthermore have proven to be of insufficient amplitude in certain applications and with an insufficiently controlled profile.

Therefore, the purpose of the present invention is to carry out a procedure and furnish a device that makes it possible to manufacture rods of a material that presents a cross-sectional composition gradient and, in particular, glass rods for making optical components with a cross-sectional composition gradient that do not present any of the disadvantages of the known procedures and devices mentioned above.

SUMMARY OF THE INVENTION

The purpose of the invention is achieved, as well as other purposes that will appear in the following description, with a procedure for manufacturing a rod of a material presenting a cross-sectional composition gradient, with this material in a fluid state at a predetermined temperature higher than the ambient temperature, so that this procedure is remarkable in that a) two different compositions of this material are prepared in a fluid state, b) the core of the rod is continuously cast simultaneously and preferably concentrically with the help of one of the compositions and a sheath that envelops this core with the aid of another composition and c) the casting is then taken to a temperature at which it solidifies to constitute a rod.

Using the method or procedure according to the invention, a rod is continuously produced from a material such as glass presenting the required cross-sectional composition gradient, with the continuity of the procedure making it possible to obtain high productivity and lower manufacturing costs.

According to another characteristic of the procedure according to the invention, between stages b) and c), the casting section is expanded by causing it to travel in a cylindrical mold shaped so as to define the final section of the rod. By means of this broadening of the section of the rod, blanks can be obtained from it that make it possible to make optical components of larger dimensions and by the procedures of the previous technique and, in particular, optical lenses with a diameter index gradient reaching 150 mm, for example. The procedure can also be very simply adapted to the manufacture of the components with a diameter chosen from a large range, from 10 to 150 mm, for example.

For the manufacture of a glass rod with a cross-sectional refractive index gradient by the procedure according to the present invention, the rod is made from two glass compositions capable of diff-using one into the other under heat, with these two compositions differing so that the rod presents a cross-sectional refractive index of a predetermined profile.

The invention also provides a device for implementing the procedure, with this device comprising a) at least two reservoirs, each suitable for receiving one of the two different compositions of the material, in a fluid state, with these two compositions flowing by gravity from these reservoirs through two respective orifices, the one surrounding the other, b) one tube arranged coaxially to these orifices downstream from them to collect their flows, and c) heating and adjustment means to adjust selectively the temperature of the material along its passage in the reservoirs and in the tube. Advantageously, the device further comprises, at the tube's outlet, a mold in which the material in a fluid state accumulates, following a laminar flow, with this mold being cylindrical and coaxial to the tube and its cross section greater than that of the tube.

DETAILED DESCRIPTION OF THE INVENTION

Other characteristics and advantages of the present invention will become clear from the following description when read in conjunction with the drawings as described below.

According to the manufacturing procedure according to the invention, the composition gradient is obtained by the high-temperature interdiffusion of chemical elements capable of significantly modifying the value of a physical property of the material—of glass, for example, according to their local concentration in the glass. The interdiffusion is achieved at least at one interface between two types of glass flowing concentrically in a vertical tube. The choice of types of glass is a function of the desired difference in properties and the type of profile required. In the limiting case in which there is no interdiffusion, a discontinuous composition profile is obtained (staggered).

The following description of the procedure according to the invention involves two types of glass, but the procedure may be extended to three or four types of glass, as it will immediately appear to a person skilled in the art.

Two or more types of glasses are melted separately, each in a classical type of furnace (not show), used for the manufacture of types of optical or ophthalmic glass, for example.

One preferred embodiment of the invention involves a method or procedure for manufacturing a rod of a material having a cross-sectional composition gradient, which material is in the fluid state at a predetermined temperature above the ambient temperature. The method involves the following steps: a) preparing at least two compositions of this material in the fluid state, b) simultaneously and concentrically casting one composition to form a core of a rod and casting a second composition to form a sheath around said core, and c) cooling the casting to a temperature at which the casting solidifies to form the rod.

Figure 1:
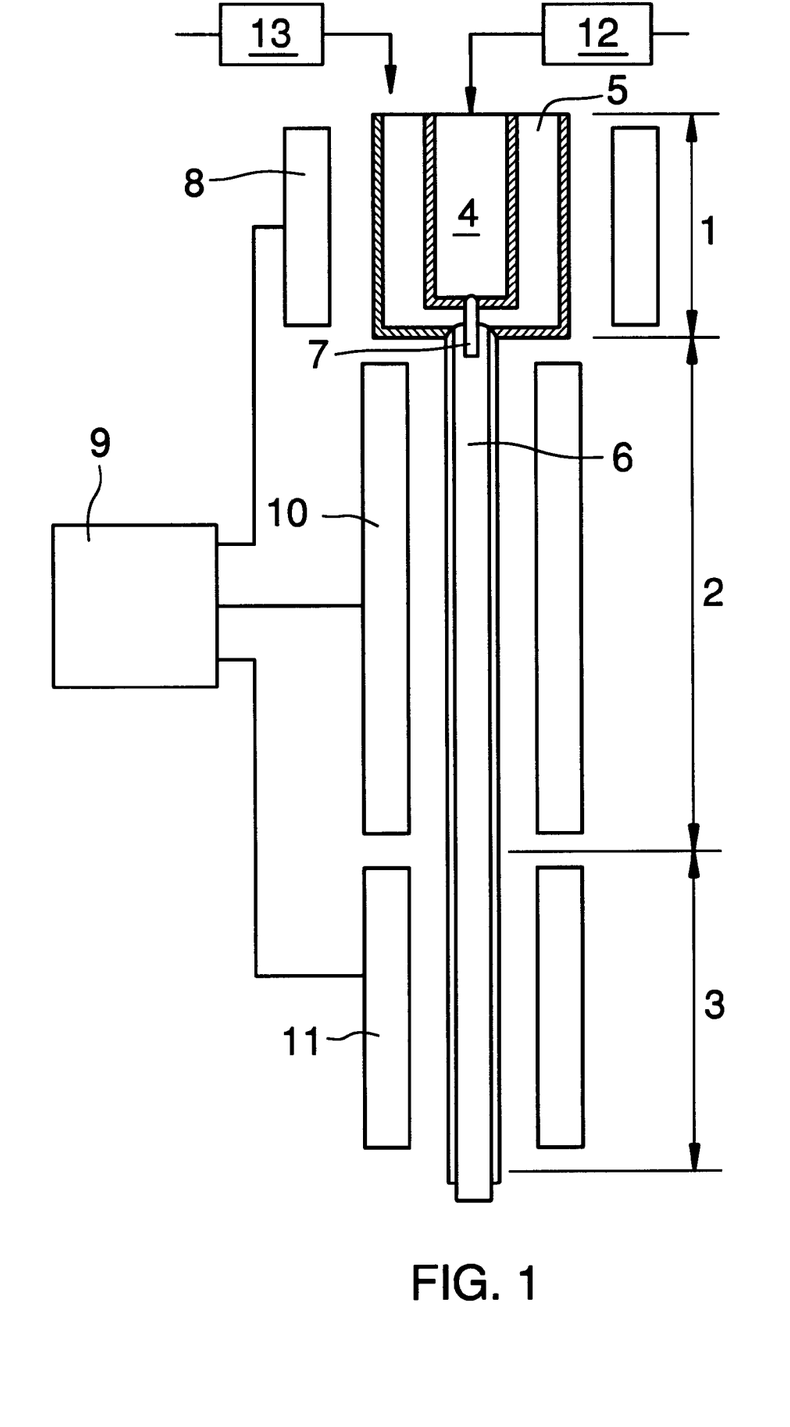
FIG. 1 is a diagram of a device for implementing the procedure according to the invention.

The device for implementing the procedure according to the invention, shown in FIG. 1, may be divided into three zones, 1, 2, 3, of connection, diffusion and conditioning, respectively. The function of the connection zone 1 is to distribute both types of glass between core and skin of a glass rod. It consists of at least two reservoirs 4 and 5 of refractory metal, encased one in the other. The position of the interior reservoir 4 is adjustable in order to be able to correct its eccentricity in relation to the exterior reservoir 5. Each one of the reservoirs 4 and 5 is fed by the glass coming from one of the melting furnaces. The lower end of the exterior reservoir 5 discharges directly into a vertical casting tube 6 and delivers the skin glass. The lower end of the interior reservoir 4 consists of a tube 7 that extends several centimeters into the casting tube 6 and delivers the core glass. The temperature in the connection zone must be homogeneous and higher than or equal to the temperature of the diffusion zone. It is important to control the temperature at the place where the fluid glasses come into contact and, therefore, to have independent regulation in that zone. Annular means of heating 8 are provided to this end, with these means controlled by regulating electronic circuitry 9.

The diffusion zone 2 is part of the tube 6 in which the diffusion of the chemical elements takes place. The depth of interdiffusion is proportional to the square root of the average length of time spent by both types of glass in this part of the tube. The temperature is kept constant throughout the zone. Depending on the type of product and the flow rate desired, the length of this zone is generally between 1 and 4 m.

The conditioning zone 3 serves the dual role of conditioning the glass to the casting temperature and of controlling the flow rate to adjust the temperature profile around the tube. The length of this zone may vary from 0.5 to 3 m. Heating means 10, 11, controlled by the electronics 9 make it possible to adjust the temperature in zones 2 and 3.

Incidentally, in the limiting case wherein interdiffusion is not sought, there is no longer any reason to distinguish among these three zones.

The dimensions of the casting tube 6 are such that they establish stable casting of the two types of glass in the diffusion zone. The stability depends essentially on the difference in density and viscosity between both fluids. It has been found experimentally that the casting should satisfy the following stability criteria:

$$\frac{gR^2(\rho_{max} - \rho_{min})}{\bar{u}\,\bar{\mu}} \text{ (preferably} < 10) \tag{1}$$

$$1 < \frac{\mu_{max}}{\mu_{min}} < 2 \tag{2}$$

with:

R: radius of the diffusion tube 6 (m)

$\rho_{max}, \rho_{min}$: densities of the densest and the least dense, respectively, of the fluids (kg/m$^3$)

$\bar{u}$: average velocity of the fluids in the tube (m/sec)

$\bar{\mu}, \mu_{max}, \mu_{min}$: average viscosity, viscosity of the most viscous and the least viscous, respectively, of the fluids in the tube 6 (Pa·sec)

In the event that both types of glass have the same density, the condition (1) always obtains and there is then no limitation on the diameter of the tube, except for the limitations due to the pressure drop.

The index profile obtained corresponds to the "S" diffusion profile, with an inflection point in the vicinity of the initial interface between the two types of glass. Trials at 1,400° have made it possible to verify that this type of profile is certainly obtained. The two parameters that make it possible to modify the shape of the profile are length of diffusion time (time spent in the tube) and the position of the interface. A profile is completely characterized by the two dimensionless coefficients, α and t*, below:

$$\alpha = \frac{R_{int}}{R},$$

relative position of the interface $$t* = \frac{tD}{R^2}, \text{ normalized length of diffusion time}$$

with:

$R_{int}$: radius of interior fluid (m)

R: radius of the tube (m)

t: length of time spent in the tube (sec)

D: coefficient of diffusion (m$^2$/sec)

Figure 2:
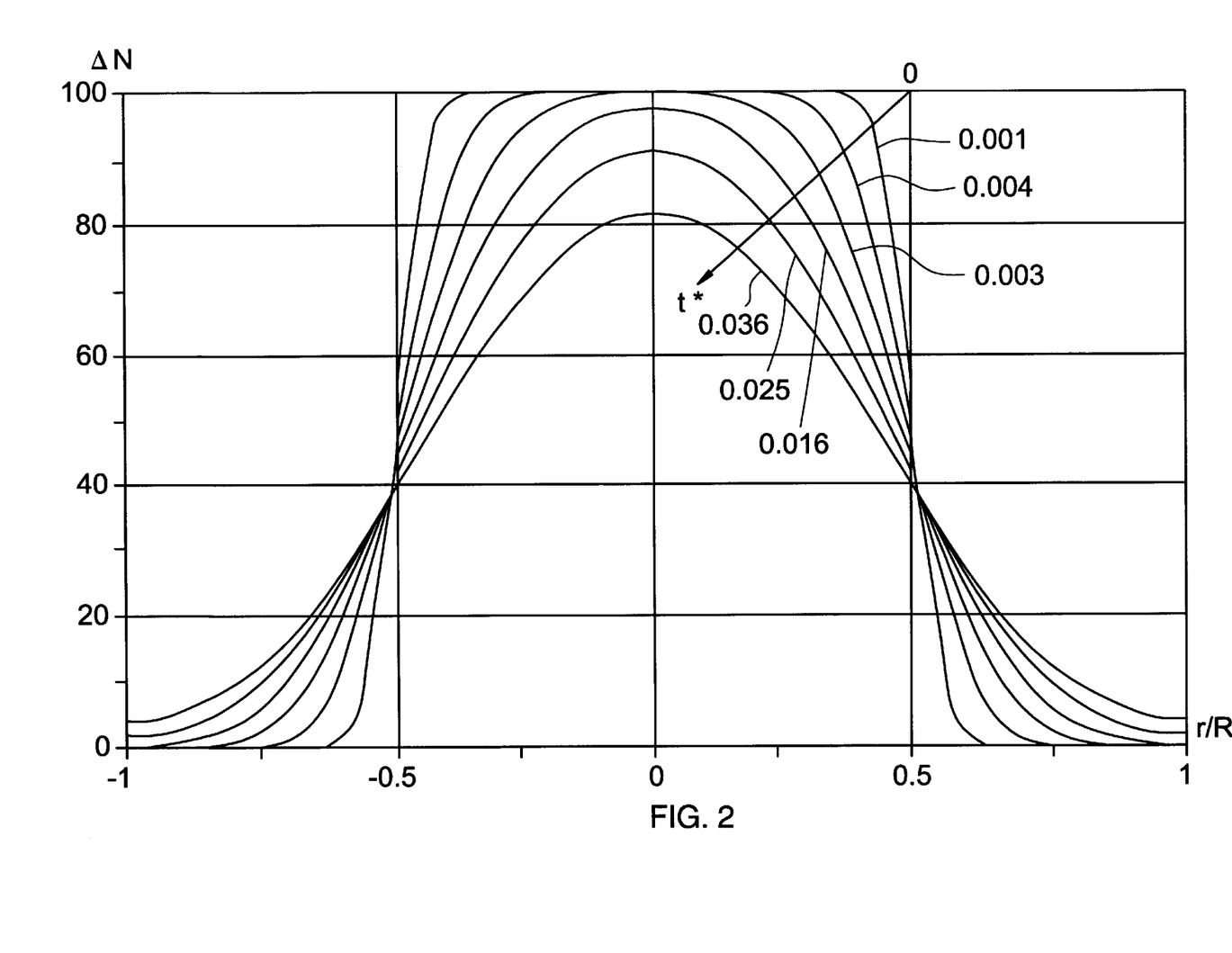
FIG. 2 shows graphs of refractive index profiles obtained in glass rods manufactured according to the invention, corresponding to different diffusion periods of the compositions of glass used.

A certain number of these profiles are represented in FIG. 2 by way of example, with α=0.5, and with each profile giving the ΔN index difference as a percentage of the maximum index difference ($N_1-N_2$) with $N_1$ and $N_2$, respectively, being the initial indexes of the core and the skin of the rod formed in the tube 6. The difference is expressed as a function of the reduced radius r/R where r is the distance from one point of the rod in relationship to the axis of the latter. It is observed that when the normalized length of diffusion time t* increases, the "breadth" of the zone of the rod which is affected by this diffusion increases, to the point that it also affects both the axial zone and the peripheral zone of the rod.

By using more than two types of glass, a still more accurate control of the profile is provided than that which one would wish to obtain.

Figure 3:
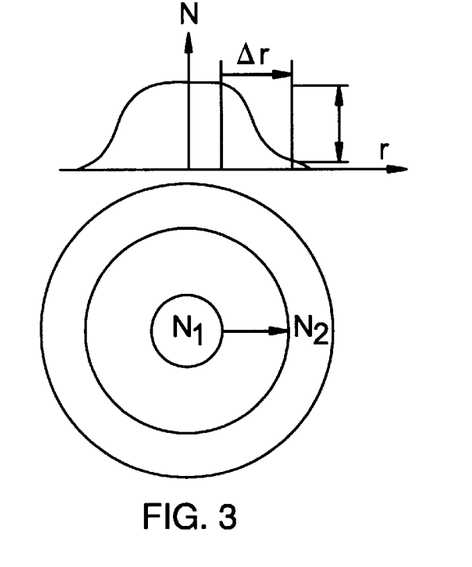
FIG. 3 illustrates a parameterization of the index gradient obtained according to the invention.

FIG. 3 shows an index profile N as a function of the radius r. The relative extent of the gradient is defined as being: $\Delta G=100\Delta r/R$. In the event that $\Delta r<R$, then $\Delta r$ represents the extent of the gradient corresponding to 99% of the initial property difference between the two types of glass. All the profiles obtained with time periods greater than the time at which $\Delta r=R$ is accurately obtained for a 99% index difference are noted as $\Delta G=100\%$.

To the extent that the diameter of the casting tube 6 has the proper dimensions, as described above, it has been found that the position of the interface depended only on the respective flow rates of each of these types of glass. At a given flow rate ratio, there corresponds a single position in the interface. In the example of FIG. 2, this interface is positioned halfway along the length of the radius. In fact, the interface may be located anywhere along the length of the tube; i.e., $\alpha$ can assume any value in the interval $[0,1]$. To adjust the ratio of the flow rates, adjustment means 12, 13, may be at the passages for directing the molten glass in the reservoirs 4, 5, respectively (see FIG. 1).

Following an advantageous characteristic of the present invention, a glass rod with a large diameter is formed by making the doughy glass casting leaving the pipe 6 go into a cylindrical mold shaped to define the final section of the rod. Lenses of a great diameter, for example, can then be formed from blanks cut from this rod.

The procedure according to the invention makes it possible to transfer homothetically the composition profile (diffused profile or simultaneous casting of two types of glass) obtained at the bottom of the tube to the rod, the diameter of which is determined by the mold.

The ratio of the diameter of this rod to the interior diameter of the tube 6 is within a broad range (1 to 100 and preferably from 1.4 to 36). The advantage of this is:
- to make rods of a large diameter from a small-diameter tube, which reduces the weight of precious metals necessary to constitute this tube;
- to avoid problems of devitrification and crystallization of the types of the glass found when easily devitrifiable glass is made to flow in a large-diameter passage and therefore with a high level of viscosity;
- to attain rod diameters considerably greater than the diameter of the tube which permit a stable casting of two different types of glass, whether or not diffused. By way of a nonlimiting example, rods of 80–100 mm can be obtained. An additional advantage of the procedure is that it makes it possible to obtain rods with very accurate dimensions and a good surface state (free of "undulation"-type surface defects, known as "chill wrinkles."

Figure 4:
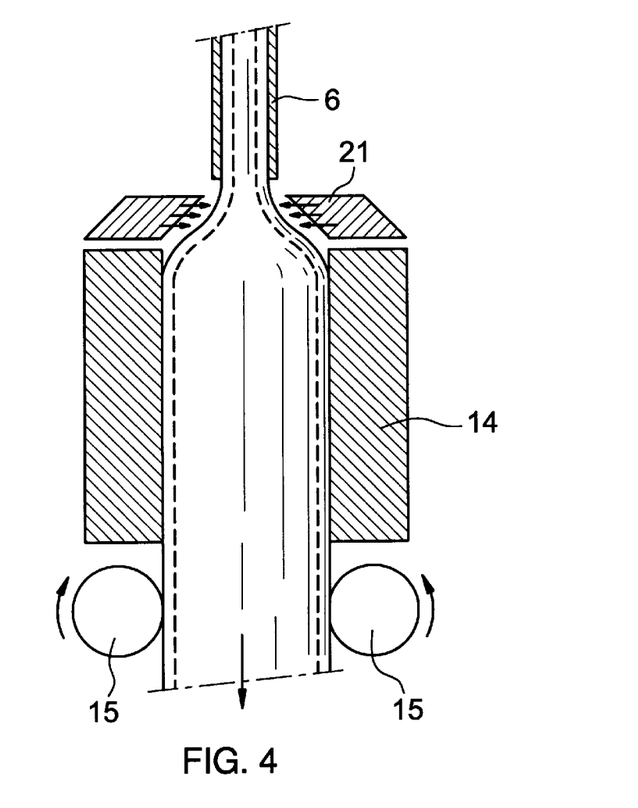
FIGS. 4, 5 and 6 illustrate different ways of making molds usable in combination with the device of FIG. 1.

FIG. 4 shows a first way of making a mold necessary for the broadening of the glass casting. The composite glass (whether or not diffused) delivered at the bottom of the tube 6, the initial interface of which is represented by discontinuous lines, flows into a vertical cylindrical mold 14 placed below the tube 6 in the axis of this tube. There is a transition zone in which the glass passes progressively from a diameter close to that of the tube to a value close to that of the mold. This flow is done in a laminar fashion and without a recirculation zone, which makes it possible to transfer homothetically the glass composition profile transfer. The glass flows continuously in the mold. This mold is equipped with means for adjusting the temperature, which makes it possible to master the rate at which the glass cools. The length of the mold is chosen so that, when the glass leaves the mold, it has reached a high enough viscosity to support its own weight and to be able to be gripped in one or several sets of suitably profiled rollers $15_1$, $15_2$, without undergoing deformations or surface damage. The role of these rollers is to support the weight of glass contained in the mold and to regulate its speed in order to keep the spreading zone of the glass at a stable rate and at a considerably constant height.

Figure 5:
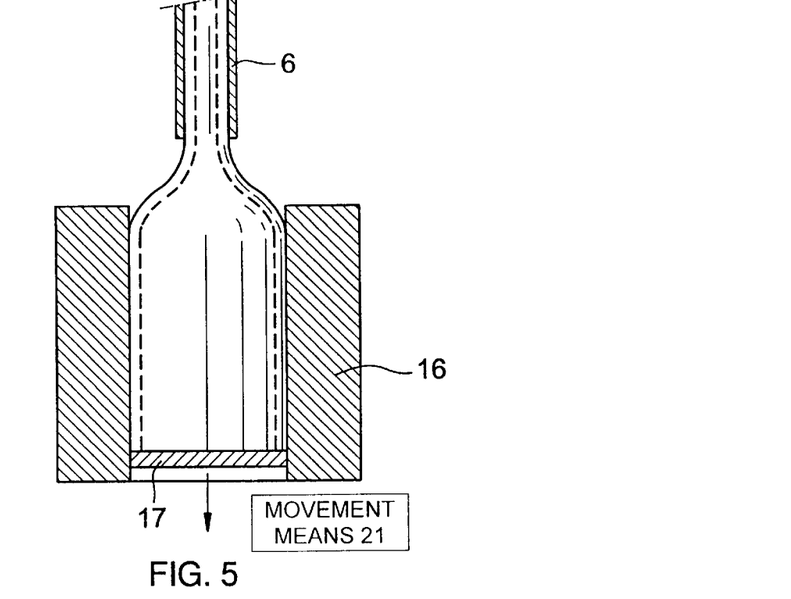

In order to start the glass passing through the mold 14, the mold may comprise a movable bottom (not shown) such as that (17) of the mold shown in FIG. 5, which will be examined in further detail, which bottom causes the casting to broaden. The bottom descends within the mold and is withdrawn after having passed between the rollers $15_1$, $15_2$.

Below the mold and the rollers, it may be advantageous to provide a thermal conditioning zone comprising adjustment means (cooling and/or heating) with a view to providing additional cooling of the glass and homogenization of the core/skin temperatures before cutting the rods into the desired dimensions. This conditioning zone may comprise one or several sets of rollers.

In the embodiment shown in FIG. 5, the mold 16 is equipped with a movable bottom 17 actuated by movement means 21, for example, by a gear motor that drives a screw jack. The mold is first presented with its movable bottom 17 in a high position within the casting tube 6, and the bottom is continuously displaced downward. When the mold is filled, it is withdrawn from below the casting tube and, after a sufficient length of cooling time, the movable bottom 17 is returned to its high position to release the glass from the mold. When the mold-positioning and withdrawal sequences occur, a shearing device may be used to interrupt the glass fiber flowing from the tube.

During the time the mold is being filled, the rate at which the movable bottom 17 descends is a function of the flow rate of the tube 6, as in the preceding embodiment, so as to prevent any turbulent flow of the glass into the mold, likely to disturb the radial composition gradient established in the tube.

As a variation, several molds arranged on a turret may be used, coming by turns into the filling and then the release position.

The molds are equipped with means for adjusting the temperature. A high temperature in the high zone of the mold is sought in order to limit the cooling of the glass in the spreading zone, with this becoming more necessary as the ratio of the mold diameter to the tube diameter increases. Lower temperatures will be sought in the lower parts of the mold in order to cool the glass.

The mold may be made of traditional materials, for example, metal materials, such as stainless steel, bronze or graphite, the latter being preferred. In the high zone of the mold, the temperatures are limited to prevent the appearance of sticking phenomena between the mold and the glass (temperatures on the order of 550° C. for a soda lime glass). In the bottom part of the mold, the temperatures may be lowered down to 400–450° C.

One disadvantage of such a mold is that the contact between glass and mold and the necessary limitation of the mold temperature cause significant cooling down of the glass in the spreading zone, which tends to cause defects known as "chill wrinkles." These chill wrinkles do not, however, necessarily spread within the volume of the glass and, provided the entire width of the glass is not used, a satisfactory product may be obtained.

Another disadvantage is that the sliding of the glass may not be completely regular, when the temperature profile of the mold is not optimum, which may, in certain cases, disturb the transfer of the profile of the glass composition.

Figure 6:
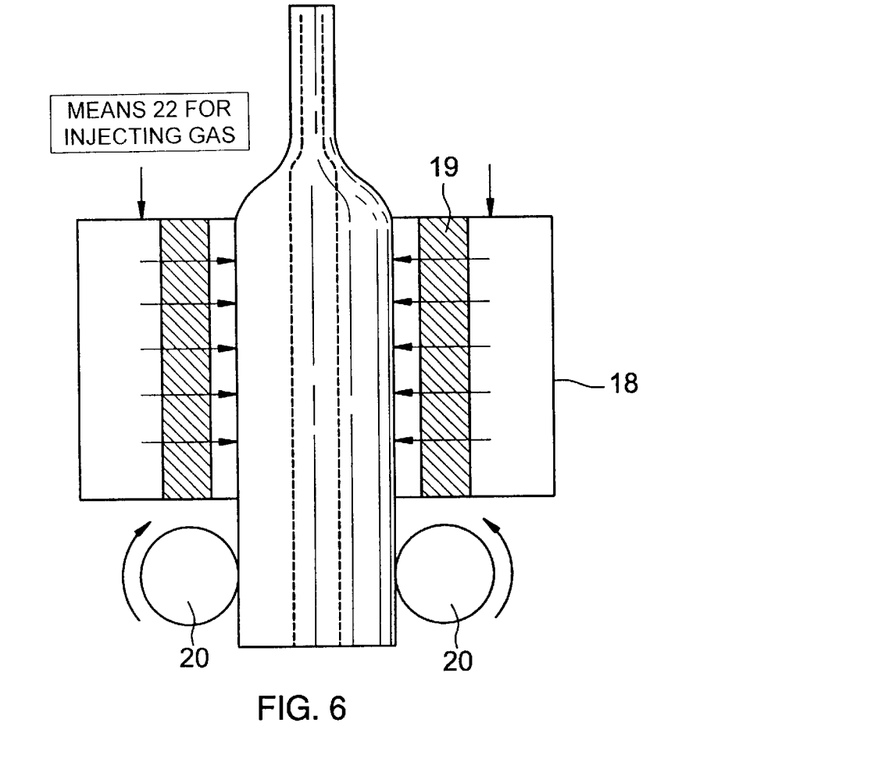
Figure 7:
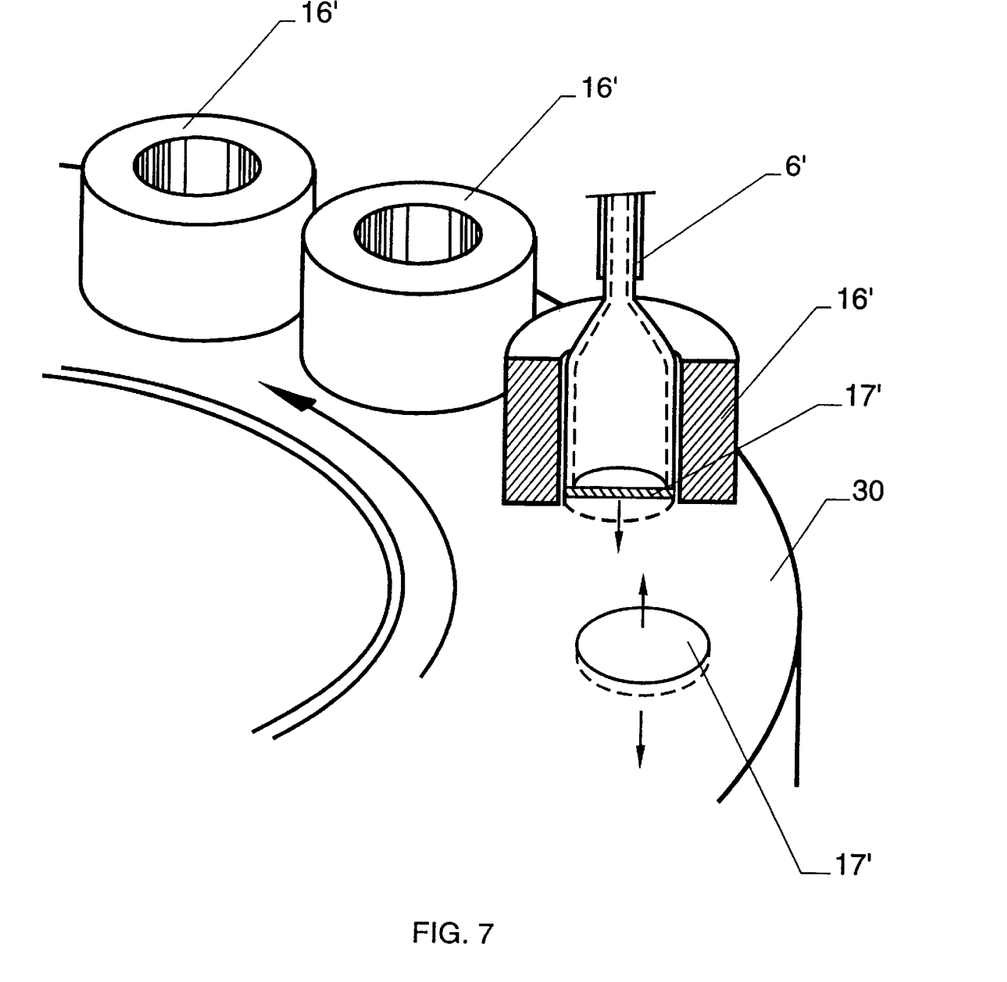

In order to eliminate any such disadvantages, the invention provides a mold 18, shown as a diagram in FIG. 6, consisting of a wall 19 made of a porous material (for example, graphite, porous bronze or stainless, or ceramic). A gas in injected under pressure through the wall 19 toward the interior of the mold by means 22 for injecting gas; this gas may consist of air or, when oxidation phenomena are to be limited, a neutral gas or reducing mixture (usual pressures for a graphite wall with a thickness of 8 mm: 1–6 bar, approximately). Rollers 20₁, 20₂ regulate the downward speed of the glass rod through the mold as in the embodiment in FIG. 4.

A gas cushion is thus formed between the inside the mold and the glass rod, which provides the following advantages: (a) high freedom of choice of temperature in the upper zone of the mold, not limited by risks of sticking. A high spreading ratio may thus be obtained, and chill wrinkles can be eliminated, and (b) the absence of contact between the glass and the mold makes resistance-free and therefore regular downward movement possible and, thus, an excellent profile-transferring quality.

The porous mold according to the invention may also be equipped with thermal control means by air or water cooling, or by electric heating or burner.

In the case of low flow rates and/or high spreading ratios (for example, a 10-mm-diameter tube, flow rate of 10 kg/h delivered at 5,000 P and a mold diameter of 100 mm), it may be prudent to add a device 21 designed to reduce heat losses below the tube, within the spreading zone (see FIG. 4). Such a device provides electric heating or heating with a burner. It may also be mechanically linked to the mold.

In practice, two cases are distinguished:

(1) a case in which very extensive property gradient is sought with regard to the radius, with a controlled profile, which involves a relatively long staying time in the tube (therefore, a low flow rate) and high interdiffusion temperatures;

(2) a case in which the aim is to transfer a heterogeneity of composition, i.e., no constraint is imposed on the length of time the glass remains in the tube or on the interdiffusion temperature. Nevertheless, there remains a "residual" interdiffusion profile.

The border between these cases may be arbitrary set at $\Delta G=20\%$, above which value it is deemed that it is not worthwhile controlling the diffusion profile.

The parameters for the flow of glass may be chosen as shown in the following table.

| Composition profile | $20 < \Delta G < 100\%$ | $0 < \Delta G < 100\%$ |
|---|---|---|
| Flow rate | 1–30 kg/h | 1–500 kg/h |
| Diffusion temperature | 1100–1500° C. | 1100–1500° C. |
| Low tube viscosity | 50–10,000 P (preferably 200 to 5,000 P) | 50–10,000 P |
| Tube diameter | 10–50 mm | 10–50 mm |
| Mold diameter | 10–100 mm | 10–150 mm |
| φmold / φtube | 1–10 | 1–10 |

The following table gives examples of the dimensions of the device according to the invention.

| t* | 0.004 | 0.025 | 0 | 0 | 0 |
|---|---|---|---|---|---|
| Composition Profile | $\Delta G = 45\%$ | $\Delta G = 100\%$ | $\Delta G = 0\%$ | $\Delta G = 0\%$ | $\Delta G = 0\%$ |
| T dif (° C.) | 1500 | 1500 | — | — | — |
| Visco dif (poises) | 60 | 60 | — | — | — |
| Casting Temperature (° C.) | 1150 | 1150 | 1150 | 1300 | 1220 |
| Casting Viscosity (poises) | 1200 | 1200 | 1200 | 250 | 500 |
| ø Tube (mm) | 16 | 10 | 30 | 20 | 40 |
| L dif. (m) | 3 | 3 | 2 | 0.5 | 2 |
| L ref. (m) | 1.5 | 0.5 | | | |
| L cond. (m) | 1 | 1 | | | |
| Flow rate (kg/h) | 12 | 2 | 50 | 70 | 500 |
| ø mold (mm) | 20–100 | 10–100 | 30–100 | 20–100 | 40–100 |

In this table:

t*: Dimensionless diffusion time defined above in connection with FIG. 2. The sizing has been done by taking into account the experimentally found stability criterion (2) and charge losses. The diffusion coefficient is on the order of $10^{-10}$ m²/sec, the density difference 0.7, and the average density is 3.

Visco dif: average viscosity at the diffusion temperature

T dif: temperature in the diffusion zone

Casting T: temperature at bottom of tube

L dif: length of the diffusion zone 2 (see FIG. 1)

L ref: length of the section in which the glass is cooled

L cond: length of the section in which the glass is maintained at casting temperature It will be noticed that L ref+L cond corresponds to the length of the conditioning zone 3 located in FIG. 1.

Of course, the invention is not limited to the embodiments described and shown, which have only been given by way of example. It is thus that, although the examples described illustrate the obtention of refractive index gradient in the glass, the invention may as well be implemented so as to establish an optical density gradient (obtention of colored glass, possibly photochromic glass, for example) or an ionic conductivity gradient, for example.

Composition gradients may also be established in materials other than glass or glass ceramics, suitable for interdiffusing in the fluid state.

The device according to the invention may comprise more than two concentric reservoirs in order to fine tune still more the control of the composition profile to be implemented.

The mold, like the tube of the device, may still present an other than circular section, for example, square or rectangular, without sharp angles for making glass rods with such a section. Moreover, it may present an orientation other than vertical, although this may be preferred in order to obtain perfectly axiallysymmetric gradients.

It is to be understood that the invention is not limited to the above examples which are chosen for illustrative purposes only. Accordingly, various changes and modifications which do not constitute departures from the spirit and scope of the invention will be apparent to persons skilled in the art, which changes and modifications are embraced by the present invention.

What is claimed is:

1. A device for making a rod having a cross-sectional composition gradient, the device comprising: a connection zone, a diffusion zone, and a conditioning zone, a) The connection zone comprising at least two reservoirs for molten glass, the two reservoirs including an interior reservoir 4 and an exterior reservoir 5 that is exterior to interior reservoir 4, each reservoir having a lower end,
b) The diffusion zone comprising a vertical casting tube 6 into which the lower end of the exterior reservoir discharges directly, into which the lower end of the interior reservoir extends,
c) The conditioning zone comprising heating elements 11 to control temperature in the conditioning zone, and opening into a vertical, cylindrical mold 14 positioned below, and in the axis of, casting tube 6 and having a diameter greater than that of the casting tube,
d) mold 14 having a movable bottom 17 and means to move bottom 17 between a high position and a low position in mold 14.

2. A device according to claim 1 wherein the ratio of the diameter of the cylindrical mold 14 to the interior diameter of the casting tube 6 is up to 100:1.

3. A device according to claim 1, further comprising guiding rollers which are located below the mold to adjust the rate of advance of the material as it exits the mold.

* * * * *